Oct. 4, 1932.  G. A. BOGUE  1,880,730
LAMP
Filed Aug. 15, 1930  2 Sheets-Sheet 1

INVENTOR
George A. Bogue
BY
ATTORNEY

Oct. 4, 1932.   G. A. BOGUE   1,880,730
LAMP
Filed Aug. 15, 1930   2 Sheets-Sheet 2
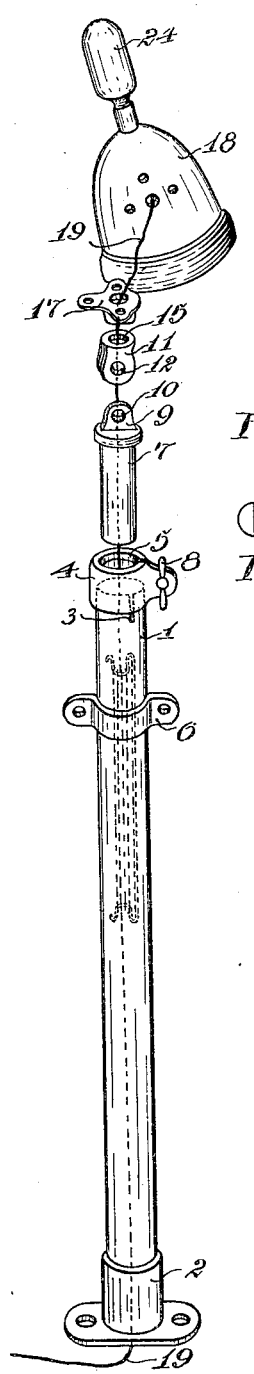
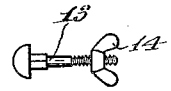
Fig.6
Fig.7
Fig.8
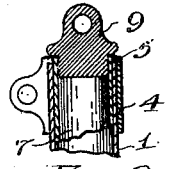
Fig.9
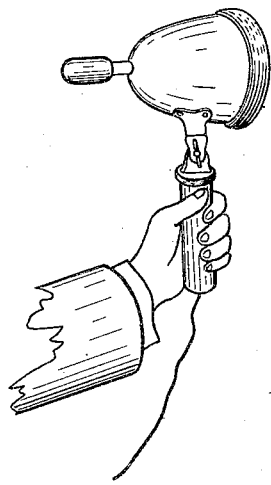
Fig.11
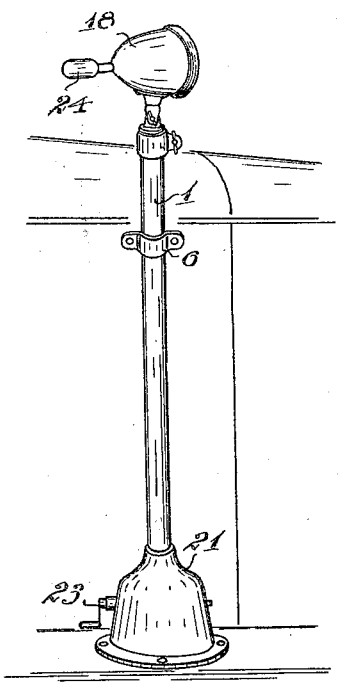
Fig.12
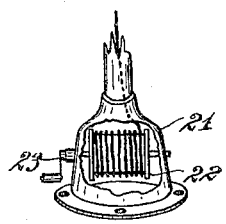
Fig.10
Fig.5
INVENTOR
George A. Bogue
BY
ATTORNEY Patented Oct. 4, 1932

1,880,730

UNITED STATES PATENT OFFICE

GEORGE A. BOGUE, OF PINE CITY, MINNESOTA

LAMP

Application filed August 15, 1930. Serial No. 475,546.

The present invention relates to an automobile spot light.

In order to obtain the maximum use from an automobile spot light the light should be securely mounted on the automobile and should be easily controlled by the occupants of the car. An additional feature which serves a valuable purpose is to have the light readily removable from the car and provided with an extension conductor cord so as to be available for use as a trouble light for working on the motor, repairing tires, and as a camp light.

An object of the present invention is to make an improved spot light for motor vehicles.

In order to attain this object, there is provided, in accordance with one feature of the invention, a spot light mounted on a tubular supporting post, the spotlight being adjustably connected to a short handle portion which is in turn pivotally connected to the tubular supporting post. A length of conductor cord connected to the light is coiled within the support member and is connected at its other end to the battery of the vehicle.

These and other features of the invention are more fully brought out in the following description and the accompanying drawings, wherein:

Figure 5 is a view in perspective of the component parts of the device separated from each other to more clearly disclose their structure.

Figure 6 is a view in perspective of a hollow bolt employed to secure the lamp to a supporting member.

Figure 7 is a view in side elevation of a bolt and wing nut used to secure the lamp support to a handle element.

Figure 8 is a view, also in side elevation, of a bolt with winged head used to tighten a collar about the upper end of the support post.

Figure 9 is a view in perspective of the upper end of the support post with the handle element partially inserted therein.

Figure 10 is a view in perspective of the base portion of a modified form of support post showing a reel for the conductor cord mounted therein.

Figure 11 is a view in perspective of the light with handle attached as it appears when removed from the supporting post; and Figure 12 is a view in perspective of the assembled device with the modified conductor reel shown in Figure 10.

Figure 1:
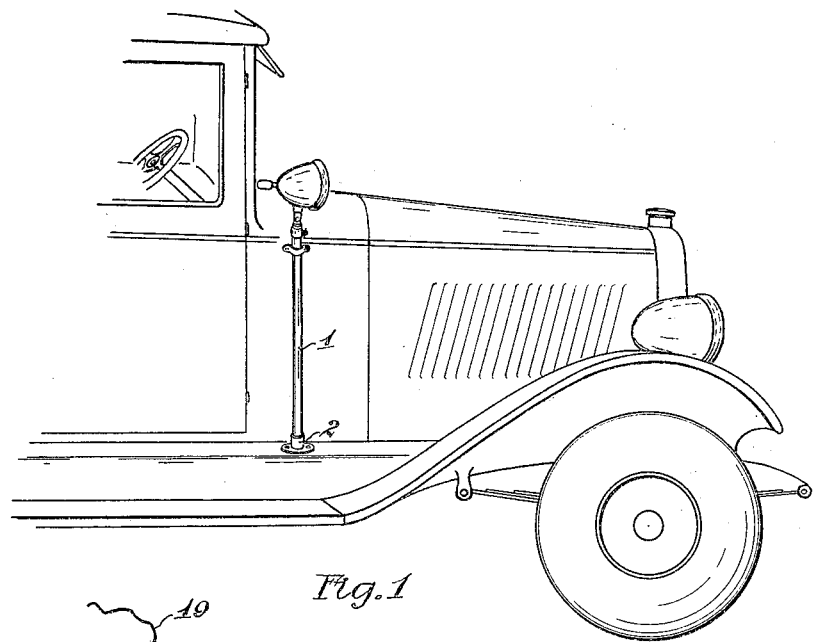
Figure 1 is a view in side elevation of an automobile having a spot light embodying the present invention mounted thereon.
Figures 2, 3, 4:
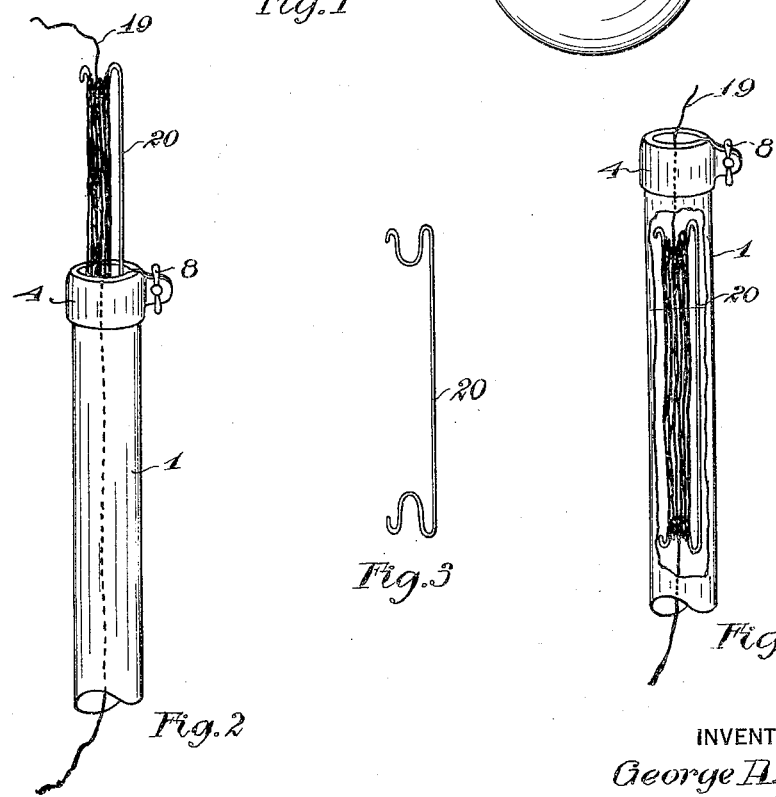
Figure 2 is a view in perspective of a portion of a tubular support member with a reel for supporting a conductor cord partially removed therefrom.
Figure 3 is a view in side elevation of a reel for supporting the conductor cord.
Figure 4 is a view in side elevation of the post and reel shown in Figure 2, with a portion of the side of the post broken away.

Referring to the drawings in detail, a tubular support member 1 is provided with a flanged base 2 by means of which the device may be mounted upon a horizontal portion of the car or other vehicle upon which the device is to be used. The upper portion of the support member is split as at 3 for a short distance longitudinally thereof. A collar 4 is provided around the upper end of the support member, said collar being provided with an inwardly extending flange 5 around the upper edge thereof to prevent the collar from slipping downwardly on the tubular member when the collar is loosened to adjust or remove the lamp. A strap 6 passes over the tubular support member and may be connected to the body of the automobile to secure the device against vibration. A tubular handle member 7 is provided to have a close sliding fit within the tubular support member 1, so as to be gripped and firmly held therein when the collar 4 is tightened by means of a winged bolt 8. The upper end of the handle member is provided with a lug 9 having a transverse hole 10 therethrough. A forked member 11 having holes 12 to register with the hole 10 in the lug 9 is adapted to fit over the lug 9 and to be pivotally connected thereto by means of the bolt 13 and wing nut 14. The fork 11 should have a fairly close fit over the lug 9 so that upon tightening the nut 14 on the bolt 13 the parts will be firmly held against pivotal movement.

The forked member 11 is provided with an opening 15 in the top thereof to receive a hollow bolt 16 which also passes through a support member 17 riveted to the lamp housing 18. This hollow bolt 16 firmly holds these parts together and provides an opening through the hollow center of the bolt 16 for the passage of a conductor cord 19 which is connected, within the housing, to a lamp socket, not shown, in a conventional manner. This conductor passes down through the tubular handle portion 7 into the tubular support member 17 where a quantity of it is wound on a reel 20 which may be formed of spring wire, and thence out through the bottom of the tubular support member 1 and is connected through a conventional switch to the battery of the car or other suitable source of electrical energy.

In the modified form shown in Figures 10 and 12, and enlarged base portion 21 is provided on the tubular support member 1 and a reel 22 is mounted therein, provided with a handle 23 projecting outwardly from the base 21 for manual manipulation of the reel. Friction or ratchet means of a conventional type, not shown, may be employed, if desired, to prevent unwinding of the conductor cord when the device is not in use.

An extension 24 on the rear end of the lamp housing 18 is provided to manipulate the lamp when mounted in the tubular support member 1, and, if desired, switch mechanism, not shown, may be mounted in this extension to control the lighting of the lamp.

In using the device the wing bolt 8 is loosened sufficiently to permit pivotal movement of the handle portion 7 within the tubular support member 1 and the lamp is then swung in a horizontal plane to bring the beam of the lamp in a desired vertical plane. The bolt 8 is then tightened to hold the lamp in this position and the wing nut 14 is loosened sufficiently to permit movement of the lamp in a vertical plane. When the proper adjustment is attained, the nut 14 is tightened to hold the lamp in this adjusted position.

When it is desired to use the lamp as a trouble or camp light, the wing bolt 8 is loosened and the tubular handle portion 7 is withdrawn from the tubular support member 1. The reel 20 may then be withdrawn from the tubular support member 1 and as much of the conductor cord as required unwound therefrom. The lamp may be supported on a stick or rod stuck in the ground or other means of support. When it is desired to remount the lamp in the tubular support post, the conductor cord is again wound on the reel which is then inserted in the tubular support member 1. The handle portion 7 is inserted in the tubular support member and the bolt 8 is tightened to securely hold it in position therein.

The operation and manipulation of the modified form shown in Figures 10 and 12 is similar except for the manipulation of the conductor cord which is apparent from the illustrations.

The structure provides a neat appearing and effective spotlight which is readily adaptable for use as a trouble or camp light.

I claim:

1. An auxiliary automobile lamp, comprising a tubular standard, mounting means to rigidly connect said standard to an automobile, a cylindrical handle member telescopically insertible within said standard, adjustable clamp means on said standard to engage said handle portion, a lamp, a connection between said lamp and handle portion, consisting of a member pivotally connected to said handle portion, a member rigidly connected to said lamp, a hollow bolt connecting the member connected to said lamp and the member pivotally connected to said handle portion, and flexible conductor means connected to said lamp and passing through said hollow bolt and handle portion and standard to a source of electricity.

2. An auxiliary automobile lamp, comprising a tubular standard, mounting means to rigidly connect said standard to an automobile, a cylindrical handle member telescopically insertible in said standard, a clamping collar surrounding the upper end of said standard and adjustable to clamp said handle member within said standard, a lamp, a member connected with said lamp and having adjustable, pivotal connection with said handle member, said member having a longitudinal central opening connected with the opening in said handle member, a reel mounted within said standard and flexible conductor means connected to the lamp and extending through said lamp, handle member, and the connection between said handle member and the lamp into and through the standard, to said reel, for the purpose set forth.

In testimony whereof I affix my signature.

GEORGE A. BOGUE.